United States Patent [19]

Lofts et al.

[11] Patent Number: 4,664,343
[45] Date of Patent: May 12, 1987

[54] SATELITE TRANSFER VEHICLE

[75] Inventors: Dennis Lofts, St. Albans, United Kingdom; David Ballard, Seabrook, Tex.

[73] Assignee: Scott Science & Technology, Inc., Lancaster, Calif.

[21] Appl. No.: 645,911

[22] Filed: Aug. 29, 1984

[51] Int. Cl.$^4$ .............................................. B64G 1/10
[52] U.S. Cl. ................................. 244/158 R; 244/172
[58] Field of Search .................. 244/158 R, 161, 164, 244/172; 102/377

[56] References Cited

U.S. PATENT DOCUMENTS

| 3,652,042 | 3/1972 | Welther | 244/158 R |
| 3,907,225 | 9/1975 | Welther | 244/158 R |
| 4,326,684 | 4/1982 | Rosen | 244/158 R |
| 4,471,926 | 9/1984 | Steel, III | 244/158 R |

OTHER PUBLICATIONS

"The European Space Tug: A Reappraisal", D. Scott and M. Hempsell, presented to the BIS Space Transportation Symposium, Jun. 1980.

Primary Examiner—Galen L. Barefoot
Assistant Examiner—Rodney Corl
Attorney, Agent, or Firm—William H. Drummond

[57] ABSTRACT

A vehicle for transferring multiple payloads from the trajectory of an earth-launch vehicle to another trajectory. The vehicle includes an engine module, to which one payload is directly attached. A carrier member extends forwardly, enclosing the first payload, which is detachably secured directly to the support frame and adapted to carry the second payload in tandem with and forward of the first payload. Cantilever and linear loads are transmitted directly by the second payload to the support frame of the engine module. The second payload, the carrier member and then the first payload are sequentially separated from the engine module after achieving another, e.g., geostationary, orbit. The vehicle may have dual-mode capability in which it can carry a single, relatively larger (heavier) payload or two, relatively smaller (lighter) payloads. In this configuration the engine module carries rocket engine and fuel supply elements which are sized to accomplish payload transfer in either mode and the operational carrier member which is employed in the dual transfer is configured such that, along with second payload, there is no substantial change in the center of gravity of the vehicle whether used in either mode.

2 Claims, 20 Drawing Figures

PRE LAUNCH ASCENT ON ORBIT

PRE DEPLOY-RMS ATTACHED

DEPLOYED-RMS RELEASED PDS ACTIVATED

D· <50 MINS

SATELITE TRANSFER VEHICLE

This invention relates to a vehicle for transferring payloads from an earth-launch vehicle in one trajectory to another trajectory.

In another respect the invention concerns such a vehicle which, without major changes in structural propulsion or electrical/avionics subsystems, can deploy either single or multiple payloads.

In yet another aspect the invention concerns a dual-mode vehicle for transferring either single or dual satelite payloads from the Low-Earth-Orbit (LEO) of the Space Transportation System (STS) into a higher Geostationary Orbit (GEO).

In recent years numerous earth satelites have been placed in earth orbit for both civil and military purposes, e.g., communications, surveillance, scientific investigations, etc. Initially these satelites were placed in orbit by multi-stage conventional liquid or solid fuel rockets, the upper stage of which functioned to transfer the payload from an initial orbit achieved by the first stages of the rocket into another orbit of different shape or distance from the earth. These final stage or orbit "transfer" stages have achieved high states of development and reliability. However, significant economic and other practical problems are encountered in the use of such present technology because of the primary fact that each transfer vehicle can only accommodate payloads which are within a fairly narrow weight-size-shape range. Consequently, users of the currently-available range of space technology are constantly faced with the necessity of developing satellite transfer vehicles specifically adapted for orbit placement of payloads when the size or weight (and sometimes the shape) of the payload is changed. This results in multiplication of development and engineering costs, higher production costs and lengthy delays.

More recently, the United States of America has developed and demonstrated the technical and commercial viability of the so-called space shuttle (more officially designated the Space Transportation System or "STS"). This well-known earth-launch vehicle provides, for the first time, a reusable, highly versatile earth-launch which can carry a wide variety of payloads into LEO and which can then be deployed from the cargo bay of the STS and re-launched or "transferred" from LEO to another orbit utilizing a separate vehicle carried with the payloads in the cargo bay to accomplish the transfer. The most familiar of such transfer vehicles are the so-called "PAM" (payload assist module) vehicles which were adapted for use with the STS from vehicles which formerly served this function in connection with unmanned delta rockets. However, although PAM vehicles have been successfully employed in conjunction with transferring payloads from the LEO of the STS into GEO, there are still significant practical and economic limitations on their use with certain current and technologically predictable payloads which are both larger (heavier) than and smaller (lighter) than the payloads for which the modified PAMs were developed.

It would be highly desirable, therefore, to provide a satelite transfer vehicle or payload transfer vehicle which can transfer at least a pair of relatively smaller payloads or satelites from the trajectory of an earth-launch vehicle to another trajectory and, desirably, one which would accommodate either a single larger (heavier) payload or two smaller (lighter) payloads without major changes in the structure and other on-board systems such as propulsion, electronics/avionics, etc. It would be particularly desirable to provide such a dual-mode STV which is specially adapted for use with the STS, thus achieving utility over a wider range of payload weights or sizes and providing the capability for return to earth in the shuttle cargo bay in the event deployment of the payload(s) is aborted for any reason.

Accordingly, the principal object of the present invention is to provide an improved satelite transfer vehicle.

Another object of the invention is to provide an STV with dual-mode (single or double payload) capability.

Yet another object of the invention is to provide a dual-mode STV which is specially adapted for use with the STS.

These and other, further and more specific objects and advantages of the invention will be apparent to those skilled in the art from the following detailed description thereof, taken in connection with the drawings in which.

Figure 14:
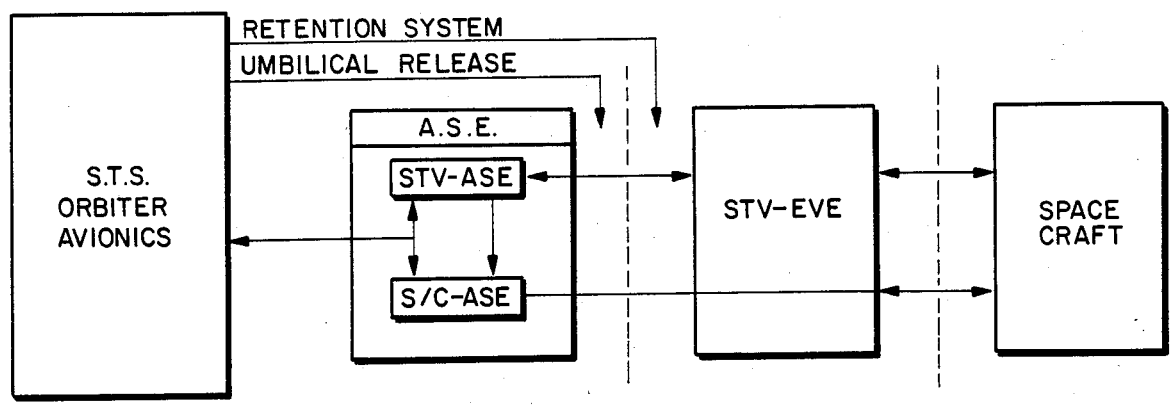
FIG. 14 is a schematic illustrating the relationship of the electrical systems of the STS, the STV motor module and airborne support equipment for the STV engine module and spacecraft.
Figure 15:
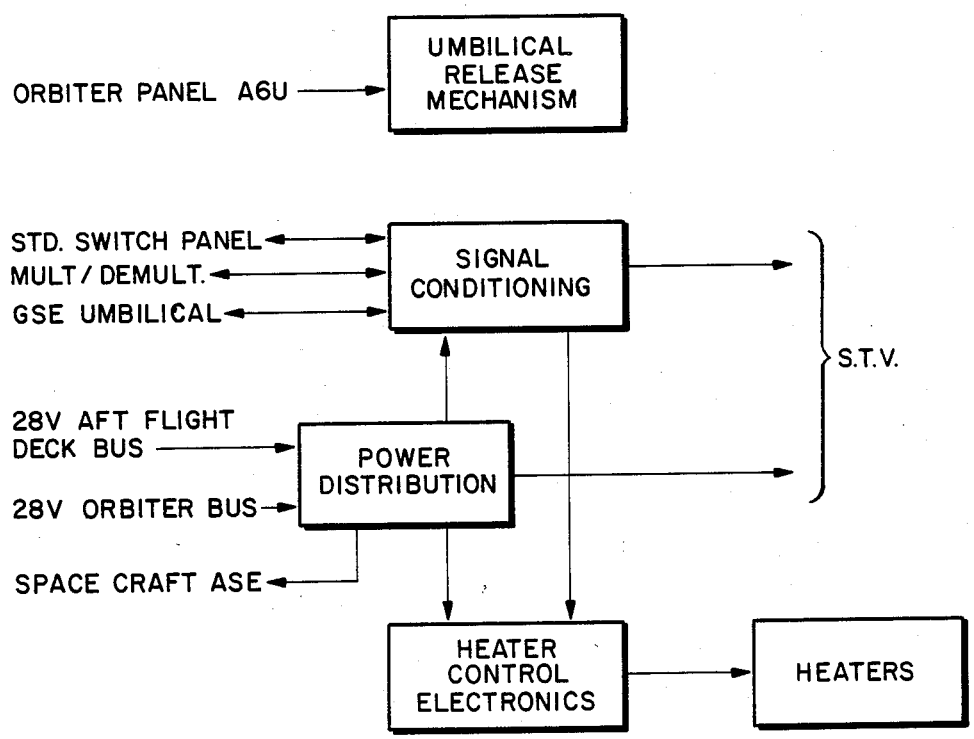
Figure 16:
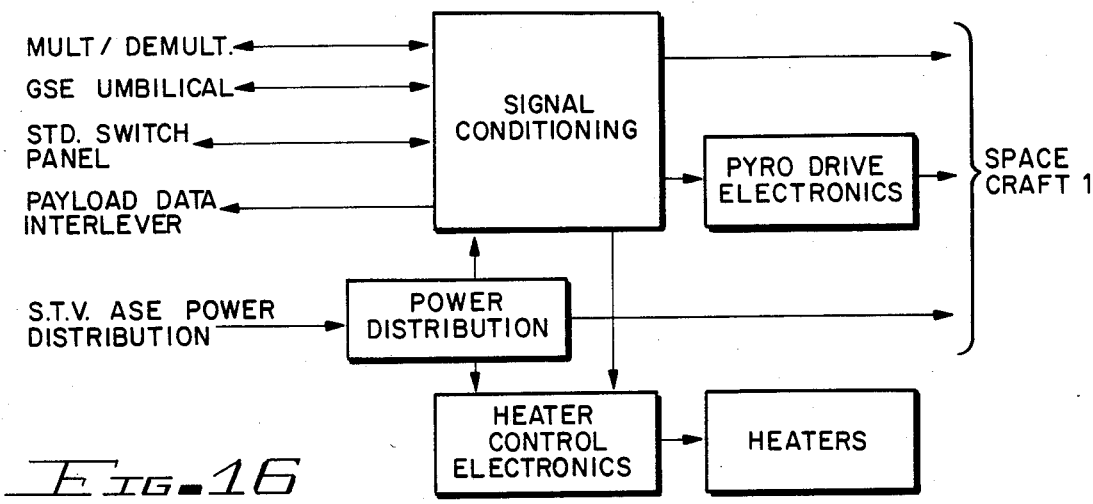
Figure 17:
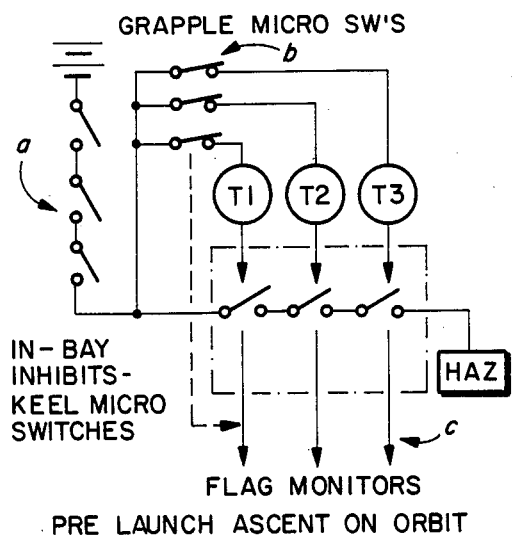
Figure 18:
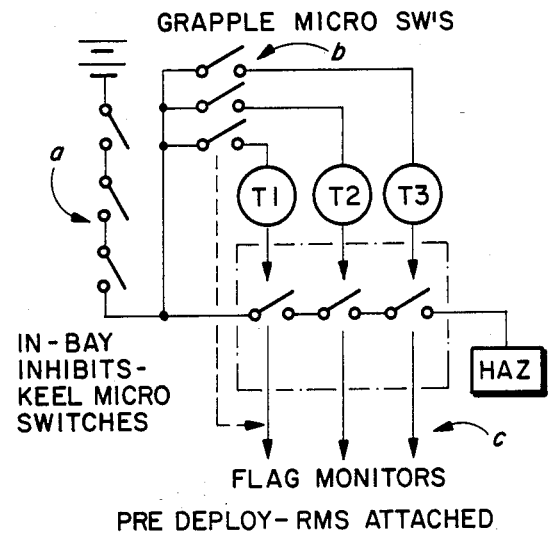
Figure 19:
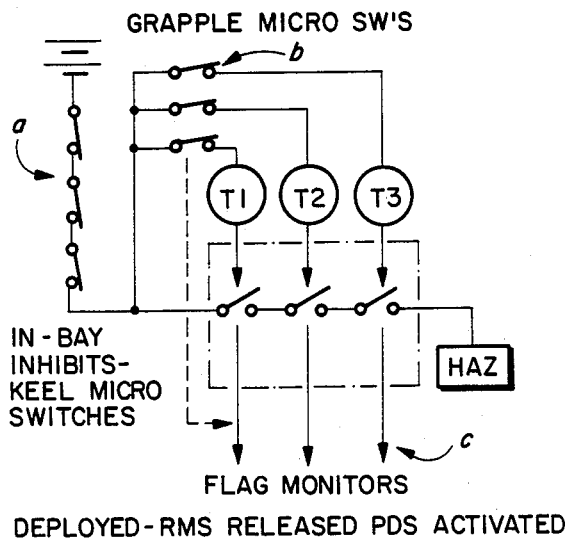
Figure 20:
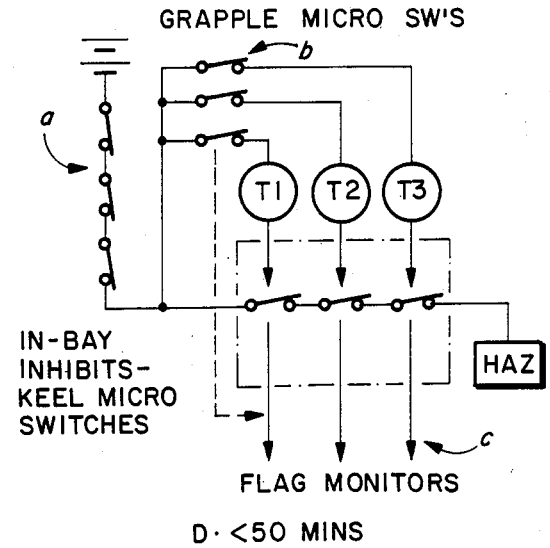

FIG. 15 further depicts details of the airborne support equipment for the engine module of FIG. 14;

FIG. 16 is a schematic which further illustrates airborne support equipment for the payload of FIG. 14;

FIG. 17 is a schematic illustrating the safety and launch vehicle interfaces during pre-launch, ascent and LEO;

FIG. 18 illustrates the pre-deployment condition of the interface system of FIG. 17 after RMS attachment;

FIG. 19 illustrates the condition of the safety and launch vehicle interface of FIG. 17 after RMS release and PDS activation; and FIG. 20 illustrates the condition of the interface system of FIG. 17 after deployment and prior to primary propulsion system ignition.

Briefly, in accordance with the invention, we provide a vehicle for transferring multiple payloads from an earth-launch vehicle in one trajectory to another trajectory. The transfer vehicle comprises an engine module, means for detachably mounting a first payload on and forwardly of the support frame of said engine module, a forwardly extending carrier member for carrying a second payload in tandem forwardly of the first payload and means for sequentially detaching the second payload from the carrier member, the carrier member from the engine module support frame and the first payload from the support frame.

The engine module includes a support frame shaped, dimensioned and adapted to be carried by the earth-launch vehicle. The support frame, in turn, carries on-board mission equipment, including a rocket engine, related fuel supply, ignition and control equipment and electrical power supply equipment. The rocket engine is enclosed by and carried in a central thrust cylinder which includes a thrust cone directed rearwardly of the support frame. The vehicle-attitude control equipment includes a reaction control system and related fuel supply and control equipment.

The carrier member for the second payload is shaped and dimensioned to enclose and extend forwardly of the first payload which is carried on the engine module support frame. The carrier member is detachably secured at its rear portion to the support frame and carries on its forward portion means for detachably securing a second payload. The carrier member functions to transmit cantilever and linear loads directly between the support frame of the engine module and the second payload, to insulate the payload from such loads.

In accordance with a presently preferred embodiment of the invention, the transfer vehicle described above has a dual-mode capability, i.e., a first mode for transferring a single relatively heavier payload from the trajectory of the earth-launch vehicle to another trajectory and a second mode in which the vehicle transfers two, relatively lighter payloads from the trajectory of the earth-launch vehicle to at least one other trajectory. In this embodiment, the dual-mode vehicle includes the engine module described above in which the rocket engine and fuel supply elements are sized to accomplish payload transfer(s) in either of the two modes. The carrier member, when used in accordance with the second "dual payload" mode and the dual payloads are configured in this embodiment to be mounted and carried upon the engine module without substantially changing the center of gravity of the resultant vehicle in the second mode of operation from the center of gravity of the engine module and single payload utilized in the first "single mode" of operation.

In the further and more specifically preferred embodiment of the invention, the transfer vehicle is the dual-mode vehicle described above which is capable of transferring either single or dual payloads from an earth-launch vehicle in low-earth-orbit to a higher geostationary orbit. The earth-launch vehicle with which the transfer vehicle is employed includes a fuselage with an elongate cargo bay extending along the longitudinal axis of the fuselage. Primary propulsion engines are carried rearwardly of the fuselage for launching the earth-launch vehicle and the single or dual payload/transfer vehicle combination from the earth into the low-earth-orbit. The fuselage also includes a remote manipulation system operatively associated therewith for selectively grappling payloads in the cargo bay, removing the loads therefrom and deploying the loads outside the earth-launch vehicle. The earth-launch vehicle also includes means for non-destructibly returning the earth-launch vehicle from low-earth-orbit to the earth for reuse.

In this preferred embodiment, the dual-mode transfer vehicle includes an engine module, forwardly extending carrier member and payload(s) which are sized and shaped to be received within the cargo bay of the earth-launch vehicle and which are adapted to be removably secured in the cargo bay during the pre-earth launch, launch and low-earth-orbit phases of the earth-launch vehicle mission. The transfer vehicle further includes means cooperatively engaging the grapple of the earth-launch vehicle for removing the transfer vehicle from the cargo bay and deploying it outside the earth-launch vehicle. Such means for removably securing the transfer vehicle within the cargo bay are also adapted to secure the transfer vehicle in the cargo bay during the earth-return phase of the earth-launch vehicle mission in the event it is necessary to abort payload deployment.

Turning now to the drawings, in which the reference numerals denote like elements in the several figures, FIGS. 1–8 depict a satelite transfer vehicle constructed in accordance with the invention. The satelite transfer vehicle generally includes an engine module generally indicated by reference numeral 10, a forwardly extending carrier member, generally indicated by reference numeral 11, comprised by a cylindrical portion 11a and a conical extention 11b. In use, in accordance with a presently preferred embodiment of the invention configured to accommodate the transfer of dual payloads from LEO to GEO, the vehicle carries a first payload satelite 12a on the forward portion 13 of the support frame of the engine module 10 and a second satelite payload 12b carried on the load support ring 14 formed at the forward terminus 14 of the conical portion 11b of the forwardly extending carrier member 11. The forward portion 13 of the engine module support frame and the rear portion 15 thereof carry lateral trunnion members 16 and keel trunnions 17 which are shaped and spaced to be cooperatively engaged by load securing and carrying cheek blocks in the cargo bay of an STS or similar earth-launch vehicle. The support frame 13–15 of the engine module is enclosed in a composite outer skin 18 and carries suitable internal support struts 19 as well as sheer panels 21, tortion panels 22, all such components forming an integral support frame, shaped, dimensioned and adapted to be carried by the earth-launch vehicle.

On-board mission equipment carried by the support frame of the engine module includes a rocket engine 23 carried in a central thrust cylinder 24 which terminates in a thrust cone 25 directed rearwardly of the engine module 10. The on-board mission equipment carried by the support frame also includes engine liquid fuel supply tanks 26 and vehicle-attitude control equipment including reaction control system thrusters 27 (for pitch/yaw control) and related thrust fuel supply containers 28 and fuel system pressurant tanks 29.

Other on-board mission equipment (omitted for clarity of illustration) will, as well-known to those skilled in the art, include guidance equipment, electrical power supply equipment and suitable means (e.g., explosive bolts) for detachably securing the first payload 12a to the forward portion 13 of the support frame of the engine module 10.

The forwardly extending carrier member 11 (FIG. 1) is shaped and adapted to carry the second payload 12b in tandem forwardly of the first payload 12a. As shown, the cylindrical portion 11a and conical portion 11b are shaped and dimensioned to enclose the first payload 12a. The forward terminus 14 of the conical portion 11b of the carrier member 11 carries suitable means (e.g., explosive bolts) for detachably securing the second payload 12b thereto. In the assembled relation shown in FIG. 5, cantilever and linear loads are transmitted by the carrier member 11 directly between the support frame of the engine module 10 and the second payload 12b. For convenience, mating flanges 31 and 32 formed respectively in the forward and rear ends of the cylindrical portion 11a and the conical portion 11b of the carrier member 11 are releasably secured by any convenient means, e.g., by so-called "super zip".

Suitable control means are also carried by the engine module for sequentially detaching the second payload from the carrier member, detaching the carrier member from the support frame (which may include separation of the cylindrical portions 11a and conical portions 11b) and, finally, detaching the first payload from the support frame of the engine module 10, such control means being well-known to those skilled in the art.

Figure 1:
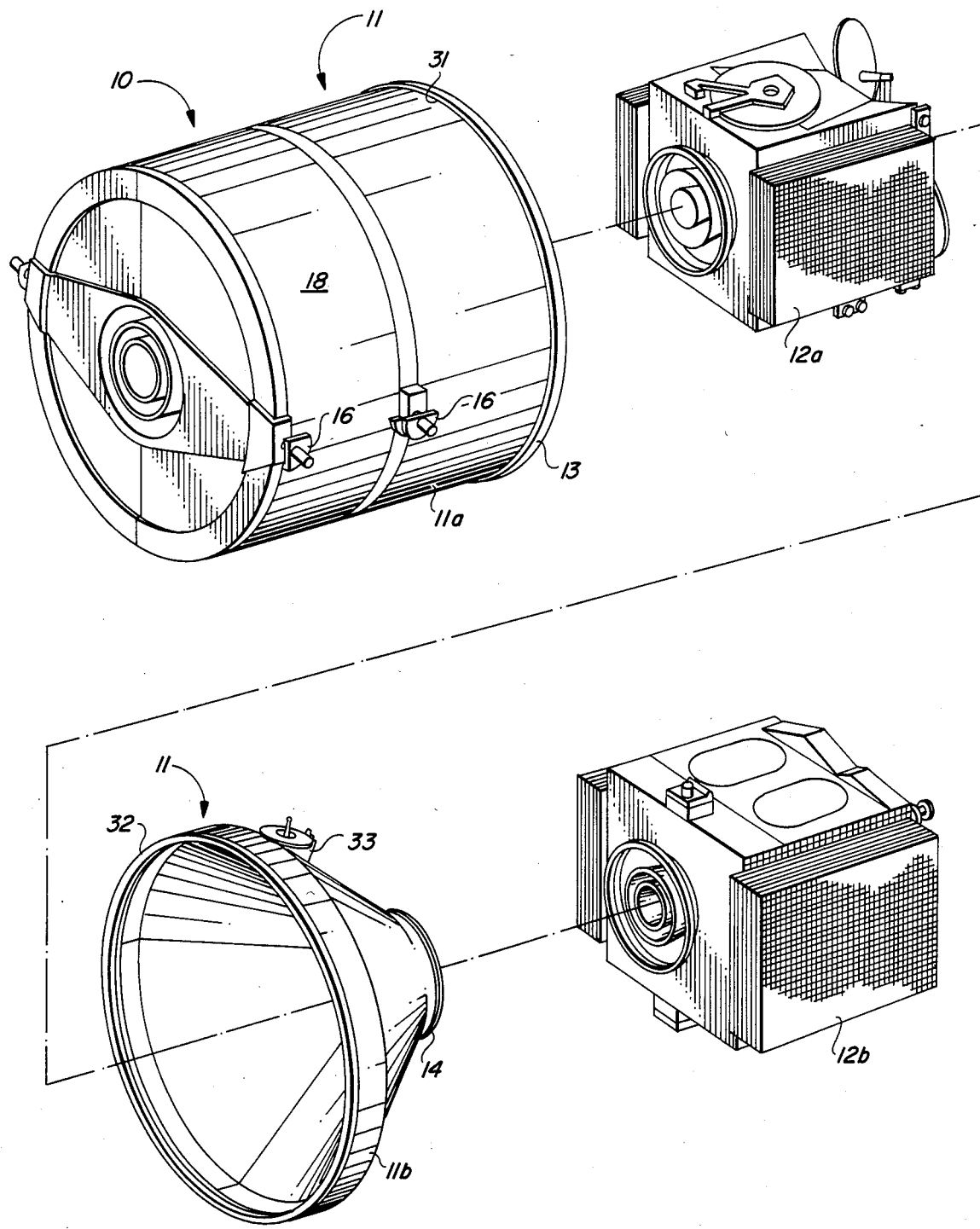
FIG. 1 is an exploded perspective view of an STV constructed in accordance with the preferred practice of the present invention.
Figure 2:
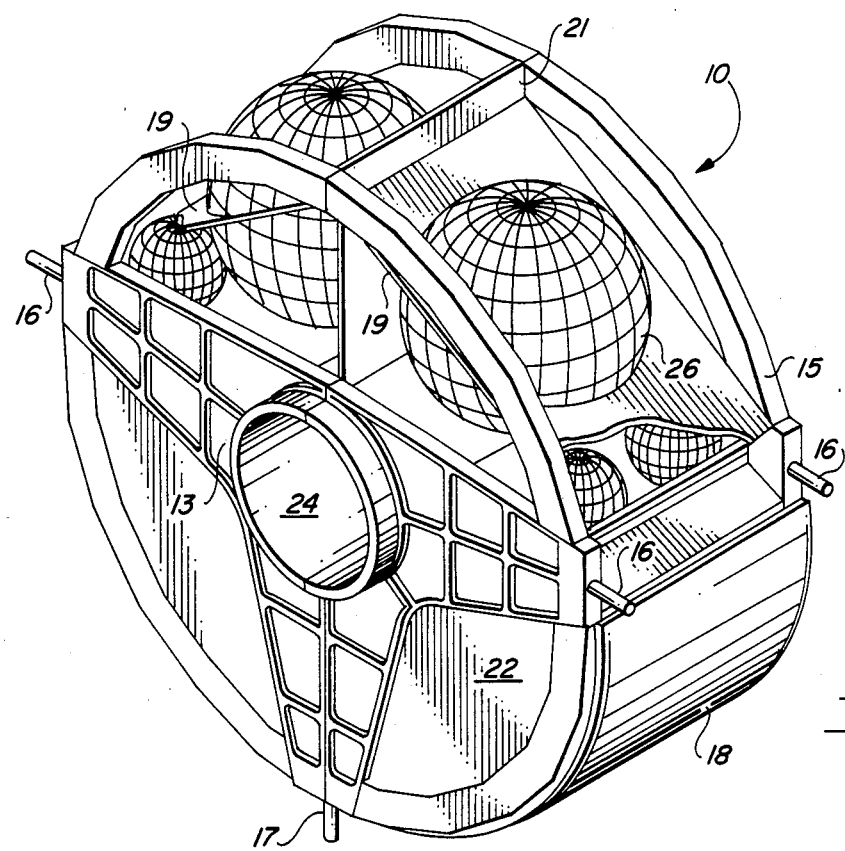
FIG. 2 is a partially cut-away perspective view of the forward end and sides of the engine module of the vehicle of FIG. 1.
Figure 3:
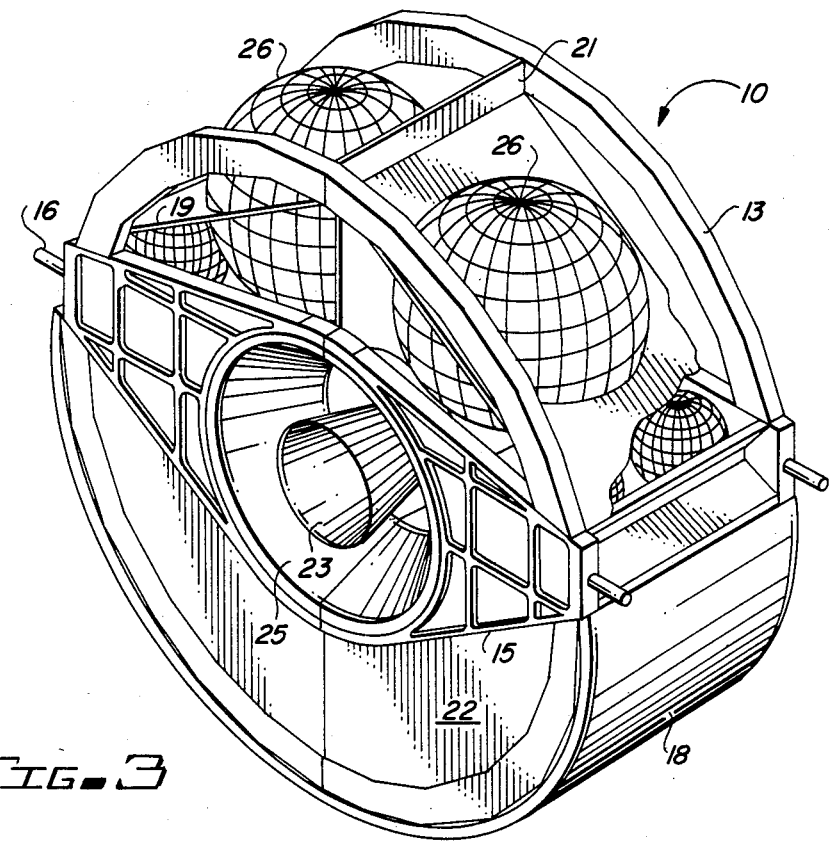
FIG. 3 is a view of the aft end of the engine module of FIG. 2.
Figure 4:
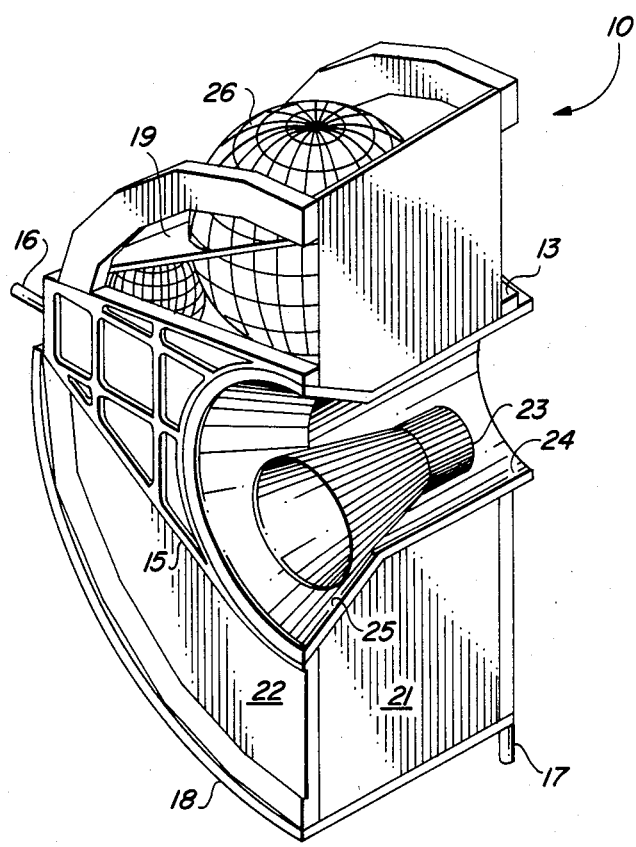
FIG. 4 is a half sectional view of the engine module of FIG. 3 taken along section line A—A thereof.
Figure 5:
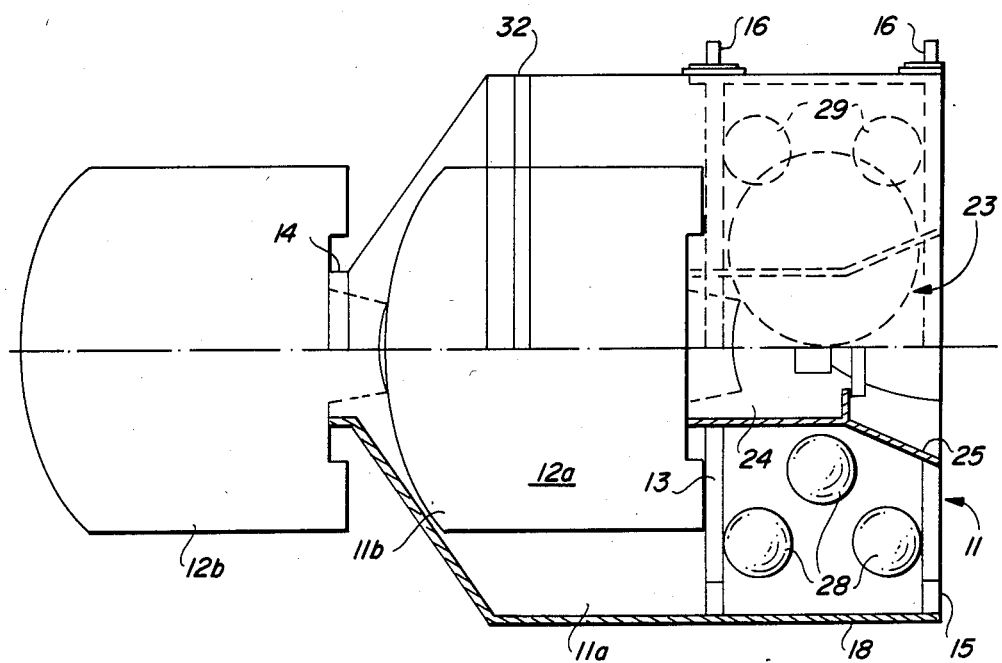
FIG. 5 is a sectional view of the assembled STV of FIG. 1.
Figure 6:
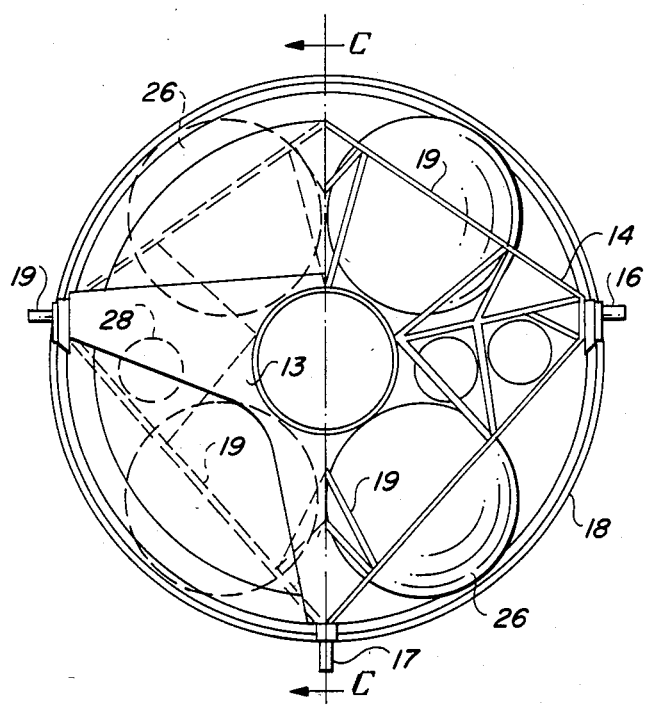
FIG. 6 is a half sectional view of the STV of FIG. 5 taken along section line B—B thereof.
Figure 7:
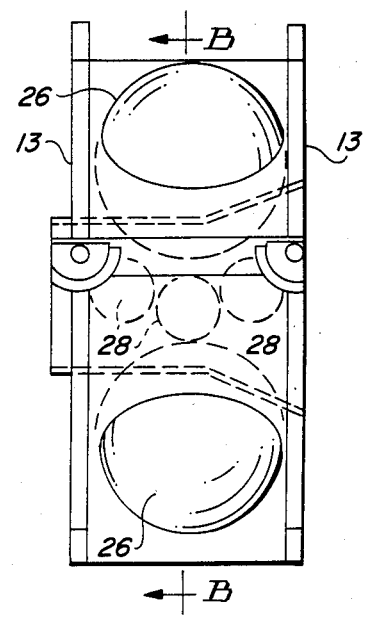
FIG. 7 is a cut-away sectional view of the engine module of FIG. 6 taken along section line C—C thereof.
Figure 8:
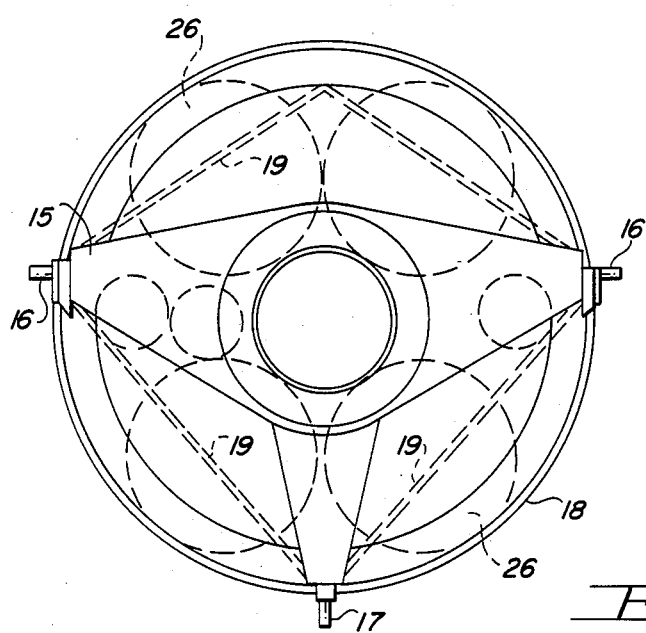
FIG. 8 is a rear view of the engine module of the STV of FIG. 5 showing major components of the propulsion and reaction control systems and some structural details in dashed lines.

Finally, as shown in FIG. 1, a grapple fixture 33 is provided, suitably located on the conical portion 11b of the forwardly extending carrier member 11 which cooperates with the remote manipulation system (RMS) of an earth-launch vehicle such as the STS to prompt removal of the STV from the cargo bay and deployment thereof outside the earth-launch vehicle.

Figure 9:
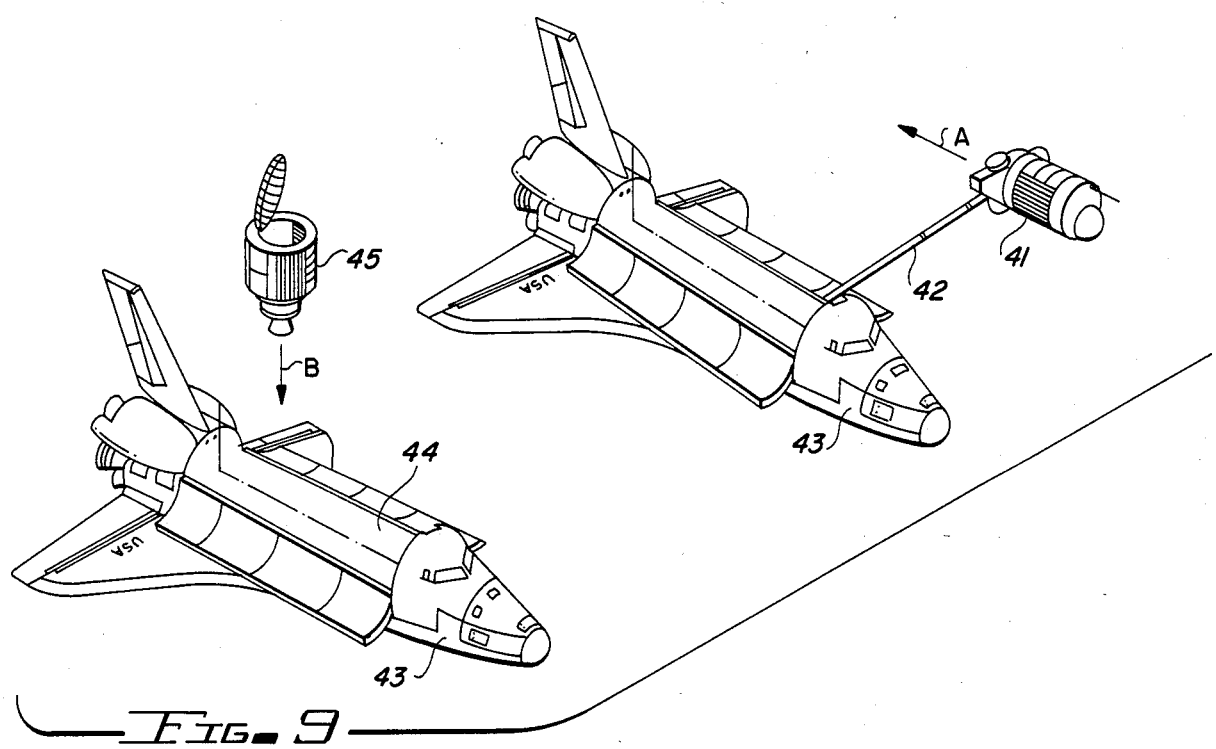
FIG. 9 is a comparison of the deployment attitudes of the PAM and the STV of the present invention from the STS.

As shown in FIG. 9, deployment of the STV 41 by the RMS 42 of the STS 43 positions the STV 41 in such manner that premature motor/engine ignition of the STV causes the exhaust plume indicated by the reference character A to be directed parallel to and rearwardly of the STS 43. By comparison, this is a much safer deployment scenario than provided by current "PAM"-type transfer vehicles 45 which, as illustrated in FIG. 9, are indirectly deployed from the cargo bay 44 of the STS 43 (by springs or other mechanical means) in such manner that premature motor/engine ignition would be directed toward the STS as indicated by the arrow B. The difference in safety aspects of the two deployment modes illustrated in FIG. 9 will be obvious to those skilled in the art.

Figure 10:
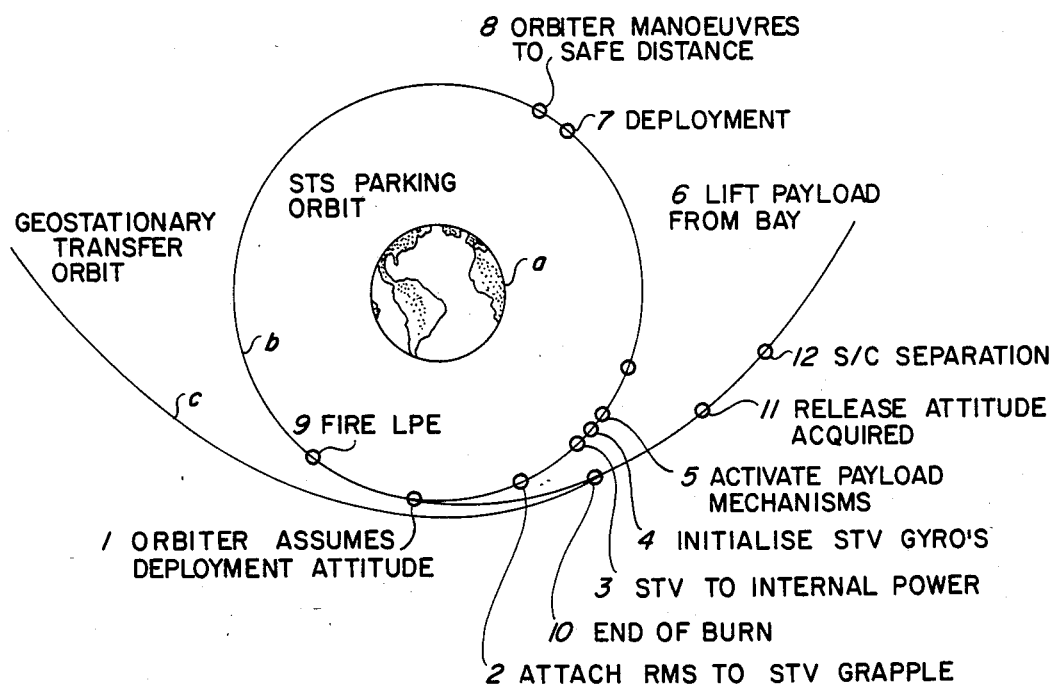
FIG. 10 depicts a typical mission scenario for the deployment of a single payload by a combination of the STS and the STV of the present invention.
Figure 11:
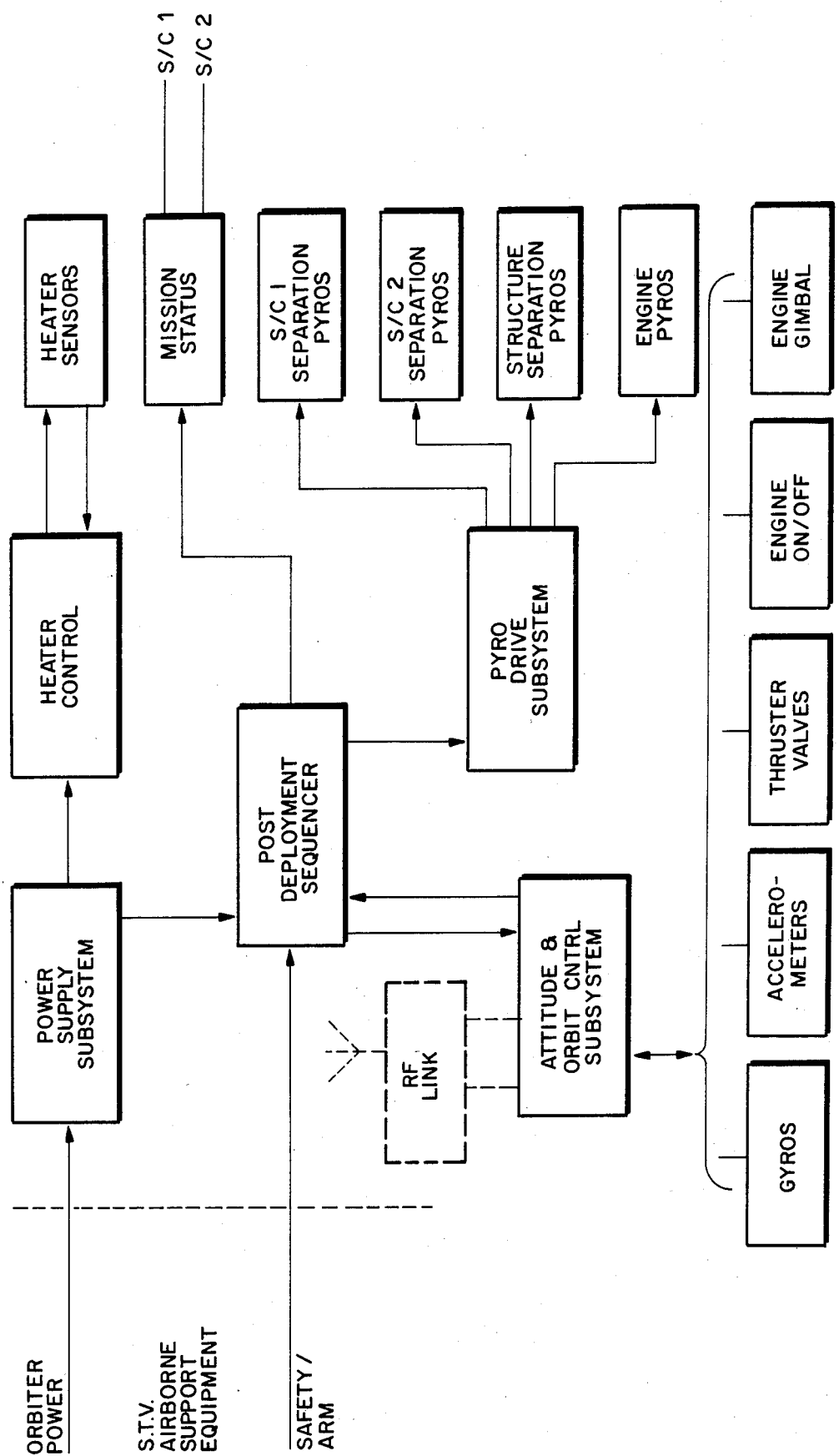
FIG. 11 is a flowchart illustrating the relationship and functioning of various major subsystems of the expendable engine module of the STV of FIG. 1.
Figure 12:
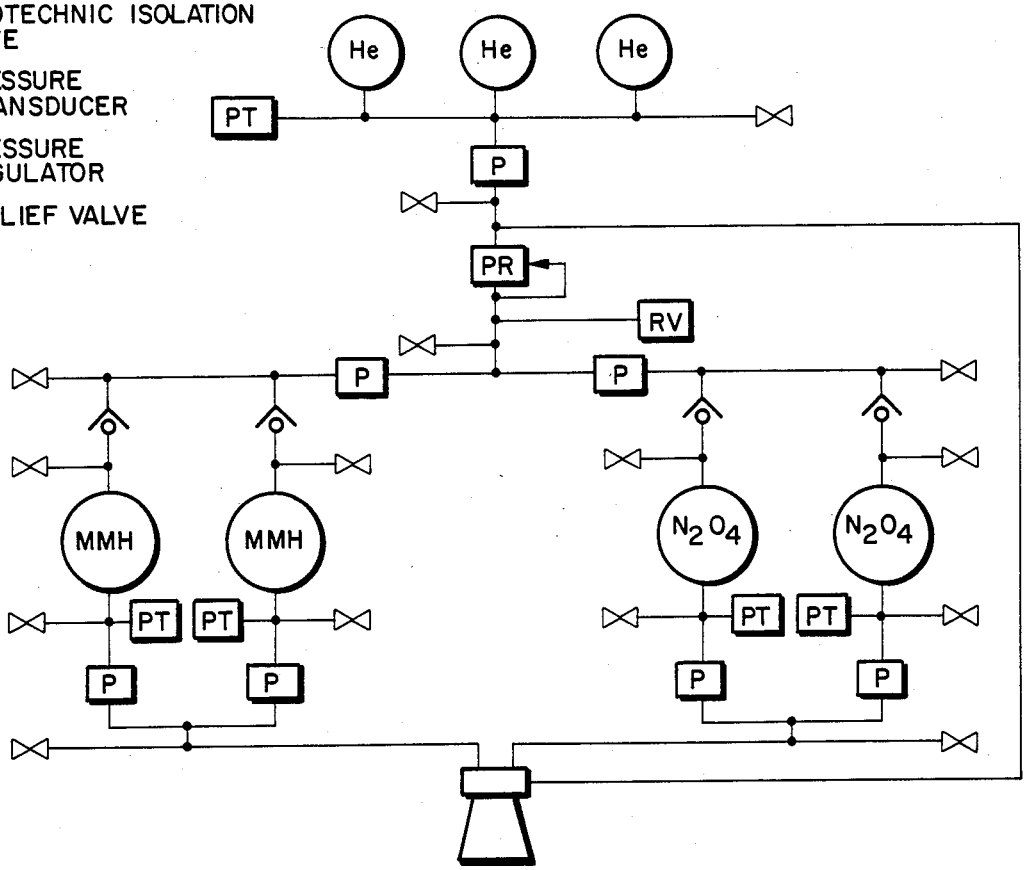
FIG. 12 is a schematic illustrating the primary propulsion subsystem of the engine module of the STV of FIG. 1.
Figure 13:
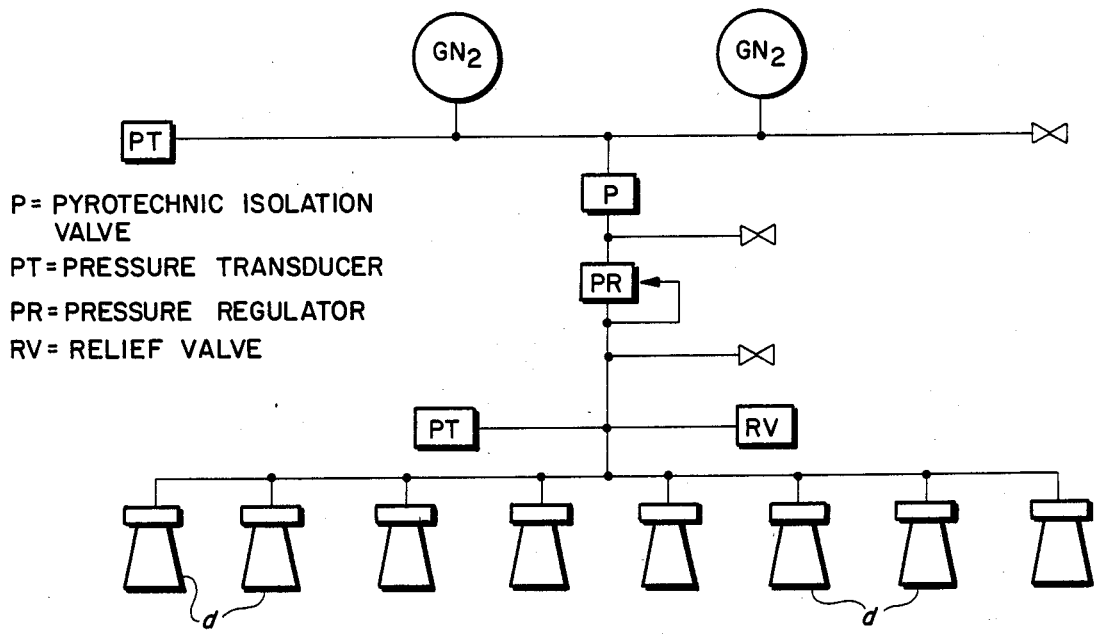
FIG. 13 is a schematic illustrating the reaction control system of the engine module of the STV of FIG. 1.

FIG. 10 illustrates a mission scenario for the STS/STV combination which constitutes the presently preferred embodiment of the invention. For purposes of illustration, the STV is assumed to be operating in the single payload mode. The various action points in the mission scenario are indicated by the circled FIGS. 1-12.

Further details and interrelationships of the various systems and subsystems of the STV of the present invention are depicted for purposes of illustration and not by way of limitation in FIGS. 11-19 which will enable those skilled in the art to understand and practice the invention.

Having described our invention in such terms as to enable those skilled in the art to understand and practice it and having identified the presently preferred embodiments thereof, we claim:

1. A vehicle for transferring multiple payloads from an earth-launch vehicle in one trajectory to another trajectory, comprising:
    (A) an engine module, including:
        (1) a support frame shaped, dimensioned and adapted to be carried by said earth-launch vehicle;
        (2) on-board mission equipment carried by said support frame, including:
            (a) a rocket engine, enclosed by and carried in a central thrust cylinder, including a thrust cone directed rearwardly of said support frame,
            (b) related engine fuel supply, ignition and control equipment,
            (c) guidance equipment,
            (d) vehicle-attitude control equipment including a reaction control system and related fuel supply and control equipment, and
            (e) electrical power supply equipment;
    (B) means for detachably mounting a first payload on and forwardly of said support frame of said engine module;
    (C) a forwardly extending carrier member
        (1) for carrying a second payload in tandem forwardly of said first payload, said carrier member:
            (a) being shaped and dimensioned to enclose said first payload,
            (b) detachably secured at its rear portion to said support frame, and
            (c) carrying on its forward portion, means for detachably securing a second payload, and
        (2) for transmitting cantilever and linear loads directly between said support frame and said second payload to insulate said first payload from said loads;
    (D) means for sequentially
        (1) detaching said second payload from said carrier member,
        (2) detaching said carrier member from said support frame, and
        (3) detaching said first payload from said support frame.

2. A payload transfer vehicle as in claim 1, having dual-mode capability
    a first mode in which said payload transfer vehicle transfers a single, heavier payload from the trajectory of an earth-launch vehicle to another trajectory, and
    a second mode in which said payload transfer vehicle transfers two, relatively lighter payloads from said earth-launch vehicle trajectory to at least one other trajectory, said payload transfer vehicle including:
    (A) the engine module of claim 1(A), in which said rocket engine and fuel supply elements are sized to accomplish said transfer in either of said modes; and
    (B) the carrier member of claim 1(C) and said payloads in said second mode of operation are configured to be mounted and carried upon said engine module without substantially changing the center of gravity of said payload transfer vehicle in said second mode of operation from the center of gravity thereof in said first mode of operation.

* * * * *